April 23, 1946.　　F. G. MANSON ET AL　　2,398,795
PARACHUTE
Filed Aug. 3, 1944　　2 Sheets-Sheet 1

INVENTORS
FRANK G. MANSON
JAMES J. MASKEY
BY
ATTORNEYS

April 23, 1946.   F. G. MANSON ET AL   2,398,795
PARACHUTE
Filed Aug. 3, 1944   2 Sheets-Sheet 2

INVENTORS
FRANK G. MANSON
BY JAMES J. MASKEY
ATTORNEYS

Patented Apr. 23, 1946

2,398,795

UNITED STATES PATENT OFFICE 2,398,795

PARACHUTE

Frank G. Manson, Chicago, Ill., and James J. Maskey, Detroit, Mich.

Application August 3, 1944, Serial No. 547,950

7 Claims. (Cl. 244—152)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to parachutes, and the general objects are to provide means for reducing the opening shock, controlling the rate of descent of the parachute, and dampening oscillations of the parachute.

A specific object of the invention is to provide a parachute with control means attached to the parachute canopy only in an area spaced from the marginal edge thereof and operable by the parachutist to deform a preselected area of the canopy when the latter is extended under load during descent.

Another object of the invention is to provide a parachute canopy with vent apertures therein and means operable by the parachutist to increase the vent aperture when the canopy is extended under load during descent.

Another object of the invention is to provide a parachute canopy with vent apertures, means operable by the parachutist to increase the vent aperture when the canopy is extended under load during descent, and means operable to decrease the vent aperture during descent.

Another object of the invention is to provide a parachute canopy with vent apertures and suspension lines, certain of the latter being arranged so as to tend to close the vents under load during descent and means operable by the parachutist to open the vent against the tension of the suspension lines when the canopy is extended under load during descent.

Another object of the invention is to provide a parachute canopy with vent apertures therein and flexible porous material covering said apertures.

Another object of the invention is to provide a parachute canopy with vent apertures covered with porous material, and control means comprising a line attached to the canopy adjacent the center thereof and operable by the parachutist.

Another object of the invention is to construct a parachute capable of accomplishing the foregoing objects without weakening the canopy or materially altering standard parachute design.

Other objects, advantages, and features of the invention will appear from the following detailed description of the invention taken in conjunction with the accompanying drawings in which.

Figure 1:
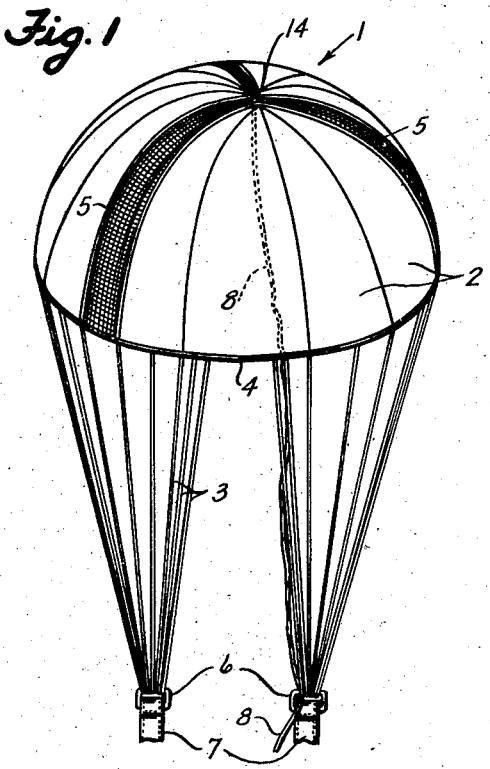
Fig. 1 is a perspective view of a parachute illustrating one embodiment of the invention wherein the canopy is provided with vent apertures covered with porous material, the parachute being shown in fully open condition in this view.
Figure 2:
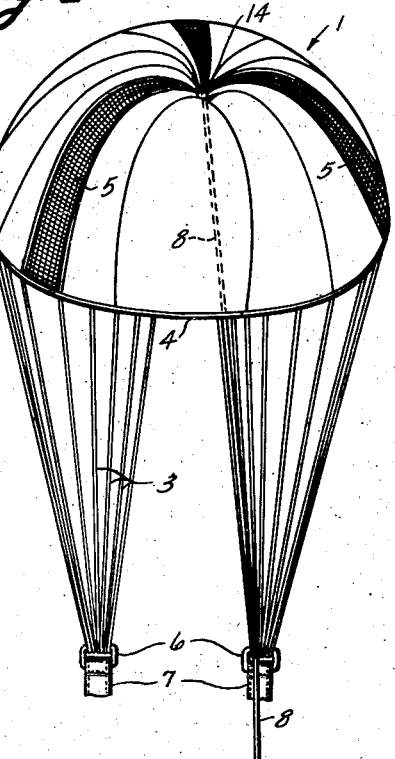
Fig. 2 is a view similar to Fig. 1 of the same embodiment of the invention but showing the canopy in partially collapsed condition.

Now referring to Figs. 1 and 2, the parachute there illustrated comprises a canopy generally indicated by the numeral 1, comprising panels 2 of flexible fabric such as silk, or the like, and the usual load suspension lines 3 attached to the canopy, said suspension lines continuing from the point of connection with the canopy 1 at the reinforced marginal edge 4 thereof to the apex of the canopy. The portion of the suspension lines in contact with the canopy 1 is inclosed within a respective seam joining adjacent panels 2 of the canopy in the usual manner. The canopy is provided with a plurality of spaced panels 5 of porous or open mesh material. The panel 5 sections of the canopy constitute vent apertures covered with the flexible porous or open mesh material as illustrated. The suspension lines 3 extend in groups through the D-rings 6 secured to respective straps 7 for securing the parachute to the parachutist. Control means comprising a line or cord 8 is attached to the under side of the canopy adjacent the center thereof and extends from the canopy down through one of the D-rings 6 so as to be convenient for manipulation by the parachutist when he desires to operate the same to deform the canopy during descent. The canopy is provided with the usual vent 14 at the center thereof.

The provision of the porous panels 5 of the construction of Figs. 1 and 2 provides the parachute canopy with venting means which will allow the passage of air therethrough so as to reduce the shock of opening of the parachute and tend to dampen oscillations of the same and thus stabilize the parachute in descent. When it is desired to decrease the opening load or to increase the rate of descent of the parachute the control line 8 may be grasped by the parachutist and pulled down to deform or partially collapse the canopy, after the manner illustrated in Fig. 2.

Figure 3:
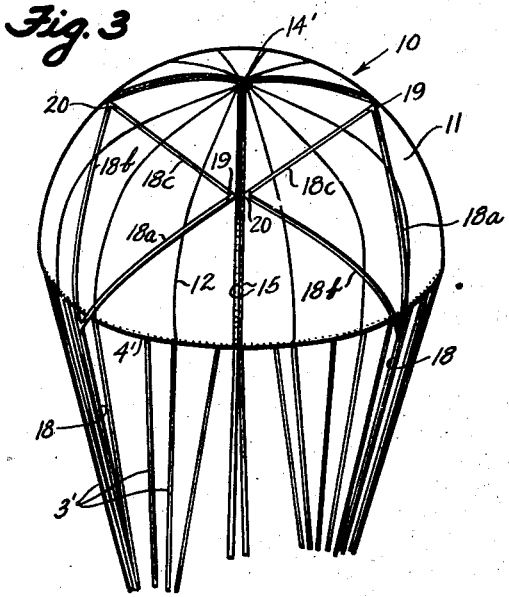
Fig. 3 is a perspective view of a parachute illustrating another embodiment of the invention wherein the canopy is provided with vent apertures and control means for said vents comprising a line attached to said canopy at points adjacent each one of a pair of vents, the canopy being shown in fully open condition in this view.
Figure 4:
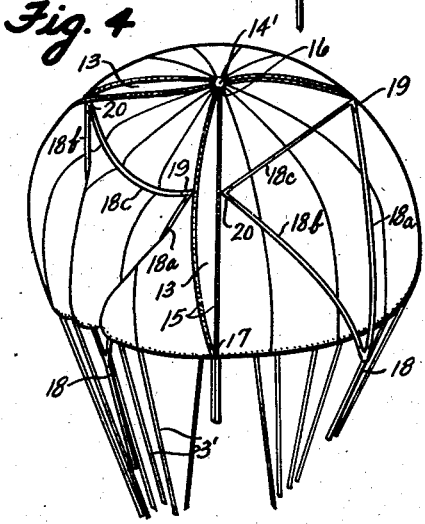
Fig. 4 is a view similar to Fig. 3 of the same embodiment of the invention but showing one of the control lines being operated to open the vents of one pair of adjacent vents and deforming a portion of the canopy intermediate the vents of said pair.

Now referring to the construction illustrated in Figs. 3 and 4, the parachute there illustrated comprises the canopy generally indicated by the numeral 10 composed of a plurality of panels 11 of suitable flexible material such as silk or the like, the panels 11 being joined together in the usual manner with the suspension lines 3' each having the portion thereof secured to the canopy enclosed within a respective seam 12 joining adjacent panels in the usual manner. The canopy is provided with the usual vent opening 14' at the apex thereof. The marginal edge of the skirt of the canopy 10 may be provided with the usual reinforcing tape or band 4'.

In the construction of Figs. 3 and 4, the canopy is provided with a plurality of symmetrically arranged radially disposed vent openings 13, which are formed by leaving the adjacent edges of certain of the panels 11 unjoined for a suitable distance. The unjoined edges of adjacent panels 11 forming the vent openings 13 are reinforced by hems, tapes or bindings 15, each having the upper end of a respective suspension cord 3' encased therein.

The portions of the suspension lines 3' which are encased within the hems 15 may be stitched to the material or fabric so as to be rigid therewith. The hemmed edges 15 of adjacent panels 11 forming a respective vent aperture 13 are joined together as at 16 where the respective hemmed edges are made rigid with the reinforcing hem or tape defining the apex vent aperture 14'. Likewise, the hemmed edges 15 of adjacent panels 11 forming a respective vent aperture 13 are joined together as at 17 where said hemmed edges are made rigid with the reinforcing hem or band 4' at the marginal edge of the canopy 10.

Thus when the parachute canopy 10 is extended under load during descent in the condition illustrated in Fig. 3, the tension of the suspension lines encased within the hems 15 and rigidly secured to the fabric tends to draw the adjacent hemmed edges 15 together so as to close the vents 13 as illustrated in Fig. 3.

In the construction of Figs. 3 and 4, control means for the vents 13 are provided associated with the canopy 10 and operable by the parachutist from the region of the point of suspension of a body upon the suspension lines 3' during descent to deform the canopy and thereby separate the adjacent hemmed edges 15, thereby tending to open the vents 13. The just-mentioned control means comprises a line or cord 18, the lower end of which may be led through one of the D-rings, such as 6 in Fig. 1 (not shown in Figs. 3 and 4), associated with the lift straps by which the parachute is connected to the parachutist so that the control cord or line 18 may be manipulated by the parachutist during descent. Each control cord 18 has two branches 18a and 18b, respectively, which run up loosely over the upper side of the canopy 10 and are stitched or otherwise joined to the fabric of the canopy as at 19 and 20 adjacent respective vents 13, the control cord being otherwise unsecured to the parachute canopy 10. Intermediate their points of attachment to the canopy 10 the branches 18a and 18b may be connected by a cord 18c which may or may not be stitched to the canopy fabric. The control line may comprise a single integral line including the line 18 and its branches 18a, 18b and 18c, as shown.

In the operation of the construction of Figs. 3 and 4, when the parachute is released from its pack during descent, the shock of opening will be reduced by reason of the opening of the vents 13 due to the air pressure, the vents 13 permitting escape of air therethrough, thereby reducing the pressure on the under side of the canopy 10 until the descent has been checked to substantially normal descent rate, the tension of the load on the suspension lines 3' tending to close the vents 13 and gradually reduce the rate of descent until normal descent rate is established. If, during the descent, the parachutist desires to increase his rate of descent, he may pull down upon all of the control lines 18 simultaneously, thereby opening the vents 13 to permit more rapid escape of air therethrough. Or, in the event it is desired to dampen dangerous oscillation of the parachute during descent, the parachutist may pull down on one or more of the control cords 18 to open one or more of the vents 13 as desired, and thus effect stabilization of the parachute.

The action of pulling down on one or more of the cords 18 not only tends to open the vents 13 but in so doing necessarily deforms a portion of the canopy intermediate an adjacent pair of vents 13 affected by a particular control line 18. This deformation of the parachute canopy is illustrated in Fig. 4 and tends to spill air from the underside of the parachute canopy assisting the effect secured by the opening of the vent apertures.

Figure 5:
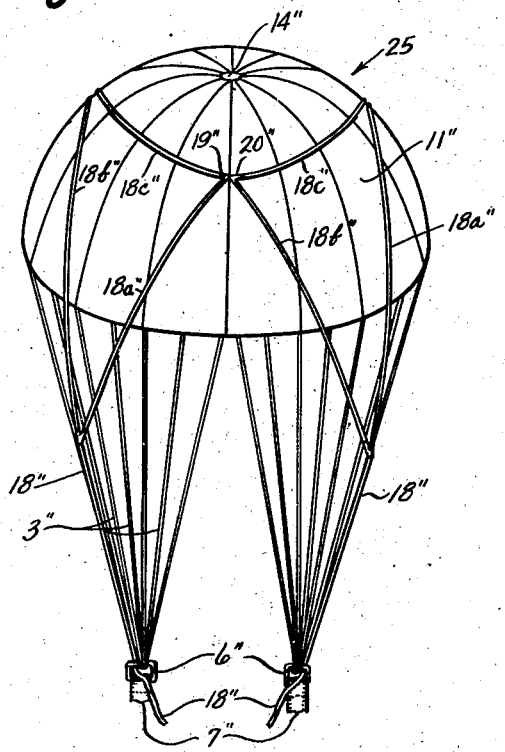
Fig. 5 is a perspective view of another embodiment of the invention wherein control means are provided attached to the parachute and operable by the parachutist to deform a preselected area of the canopy, the canopy being shown in fully open condition in this view.
Figure 6:
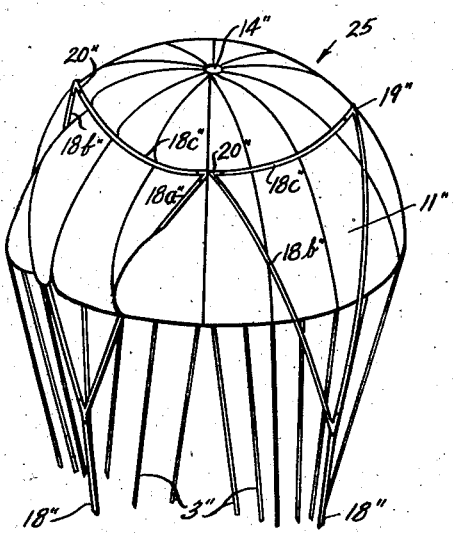
Fig. 6 is a view similar to Fig. 5 of the same embodiment of the invention but showing the control means being operated to deform the preselected area of the canopy.

The construction of Figs. 5 and 6 is similar to that of Figs. 3 and 4 except that the canopy 25 of Figs. 5 and 6 is not provided with the vent apertures 13 of Figs. 3 and 4. The canopy 25 is, however, composed of panels 11" stitched together in the manner above indicated, and is provided with the apex vent 14" and the suspension lines 3". The same type of control means as illustrated in Figs. 3 and 4 is provided in the construction of Figs. 5 and 6 comprising control cords 18" each having their respective branches 18a" and 18b" secured to the canopy fabric as at 19" and 20".

Fig. 5 illustrates the normal condition of the parachute canopy during descent and Fig. 6 illustrates the condition of the parachute canopy during descent when one of the control cords 18" is pulled down by the parachutist. The action of pulling down one of the control cords 18" is simply to deform the portion of the canopy intermediate the points of attachment to the canopy of the respective branches 18a" and 18b" associated with the particular control line 18" which has been pulled down by the parachutist. This deformation of the canopy in the area affected by the pulling down of one of the control cords 18" serves to spill air from the underside of the parachute which is effective to dampen oscillation thereof and if all the control cords 18" are pulled down simultaneously the parachutist may thereby increase his rate of descent quite considerably.

Having thus described our invention, what we desire to secure by Letters Patent is:

1. A parachute of the class described, comprising a canopy composed of flexible material and having load suspension lines attached thereto, and control means operable from the region of the point of suspension of a body upon said lines to deform a portion of the canopy when the same is extended under load during descent, said means comprising a line connected to the canopy at a point intermediate the center of the canopy and the marginal edge thereof and extending over the outer surface of the canopy to the region aforesaid, whereby, when said line is pulled downwardly, the canopy will be deformed in the area between the point of attachment of said line and the marginal edge of the canopy.

2. A parachute of the class described, comprising a canopy composed of flexible material and having load suspension lines attached thereto, said canopy being provided with a vent therein, and control means operable from the region of the point of suspension of a body upon said lines to increase the vent aperture when the canopy is extended under load during descent, said control means comprising a member attached to the canopy material at the edge of the vent and at a point intermediate the center of the canopy and the marginal edge thereof.

3. A parachute of the class described, comprising a canopy composed of flexible material and having load suspension lines attached thereto, said canopy being provided with a vent therein, certain of the suspension lines being secured to the canopy material along the edges of the vent and arranged so as to tend to close the vent under load, and control means associated with the canopy and operable from the region of the point of suspension of a body upon said suspension lines to open the vent against the tension of the suspension lines when the canopy is extended under load, as when supporting such body in aerial descent, said control means comprising a member attached to the canopy material at the edge of the vent and at a point intermediate the center of the canopy and the marginal edge thereof.

4. A parachute of the class described comprising a canopy composed of flexible material and having load suspension lines attached thereto, said canopy having a plurality of vent apertures therein and control means for said vents comprising a control line attached to said canopy at points adjacent each one of a pair of said vent apertures, said control means being operable from the region of the point of suspension of a body upon said suspension lines to deform a portion of said canopy intermediate the vents of such pair.

5. A parachute of the class described, comprising a canopy composed of flexible material and having load suspension lines attached thereto, said canopy having a plurality of vents therein, said vents comprising symmetrically disposed radial slits, and control means for said vents comprising a plurality of cords or the like, each connected to the canopy adjacent one of said slits intermediate the ends thereof, certain of the suspension lines being respectively attached to the canopy in radial alignment with respective slits.

6. A parachute of the class described comprising a canopy composed of flexible material and having load suspension lines attached thereto, said canopy being provided with a radially extending vent aperture therein, and control means for varying the effective size of the vent aperture, said control means being operable from the point of suspension of a body upon said suspension lines and comprising a pair of members each of which is secured to the canopy material at one of the opposite edges of the vent aperture and at points intermediate the center of the canopy and the marginal edge thereof.

7. A parachute of the class described comprising a canopy composed of flexible material and having load suspension lines attached thereto, and control means operable from the region of the point of suspension of a body upon said lines to deform a portion of the canopy when the same is extended under load during descent, said control means comprising a line having branches thereof secured to said canopy at spaced points thereon intermediate the center of the canopy and the marginal edge thereof, said line extending over the outer surface of the canopy to the region aforesaid, whereby when said line is pulled downwardly the canopy will be deformed in the area between the points of attachment of said branches and the marginal edge of the canopy.

FRANK G. MANSON.
JAMES J. MASKEY.